United States Patent [19]

Maissa

[11] Patent Number: 4,844,197
[45] Date of Patent: * Jul. 4, 1989

[54] HYDRAULIC RELEASE SYSTEM FOR USE IN A BOREHOLE APPARATUS

[75] Inventor: Jacques Maissa, Houston, Tex.

[73] Assignee: Western Atlas International, Inc., Houston, Tex.

[ * ] Notice: The portion of the term of this patent subsequent to Nov. 15, 2005 has been disclaimed.

[21] Appl. No.: 112,439

[22] Filed: Oct. 26, 1987

Related U.S. Application Data

[63] Continuation-in-part of Ser. No. 885,048, Jul. 14, 1986, Pat. No. 4,784,238.

[51] Int. Cl.⁴ ............................................. G01V 1/40
[52] U.S. Cl. .................................... 181/105; 367/911; 166/212
[58] Field of Search ................. 367/35, 911; 181/102, 181/104, 105; 324/367, 374; 166/64, 212

[56] References Cited

U.S. PATENT DOCUMENTS

| | | | |
|---|---|---|---|
| 3,430,698 | 3/1969 | Urbanosky | 166/212 |
| 3,565,170 | 2/1971 | Urbanosky | 166/212 |
| 4,270,569 | 6/1981 | Reay et al. | 166/325 |

Primary Examiner—Thomas H. Tarcza
Assistant Examiner—Ian J. Lobo
Attorney, Agent, or Firm—Patrick H. McCollum; Barry C. Kane

[57] ABSTRACT

Apparatus for positioning a detector at a plurality of depth locations within a borehole includes an elongated body member having a pair of diametrically opposed hydraulic pad displcement members mounted thereon. A pad mounting member is pivotally attached to each pad displacement member and a pair of borehole wall contacting members are pivotally attached to each pad mounting member. A signal detector is mounted behind one or more of the pad members. At each test depth a hydraulic power system deploys the pad displacement members from the body to an extended position and extends the wall engaging pad members into contact with the borehole wall. A redundant hydraulic safety system is provided in case of electrical system failure for releasing the pad member. The safety system includes, in addition to an electrically operated release valve, a clock operated release valve and a tension actuated release valve, all able to release hydraulic pressure on the displacement members in case of the failure of another, allowing withdrawal of the apparatus from the borehole.

16 Claims, 5 Drawing Sheets

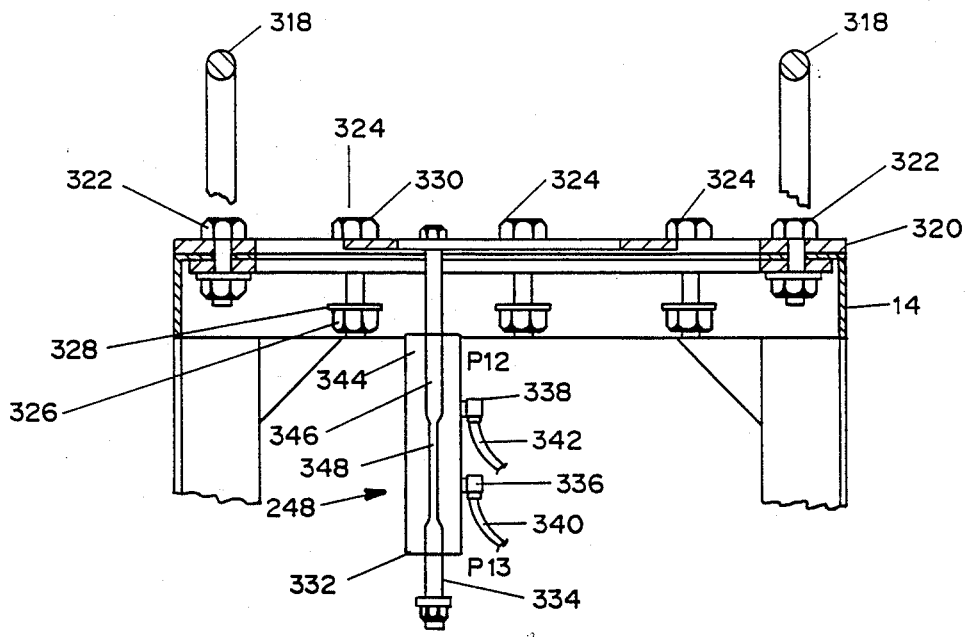
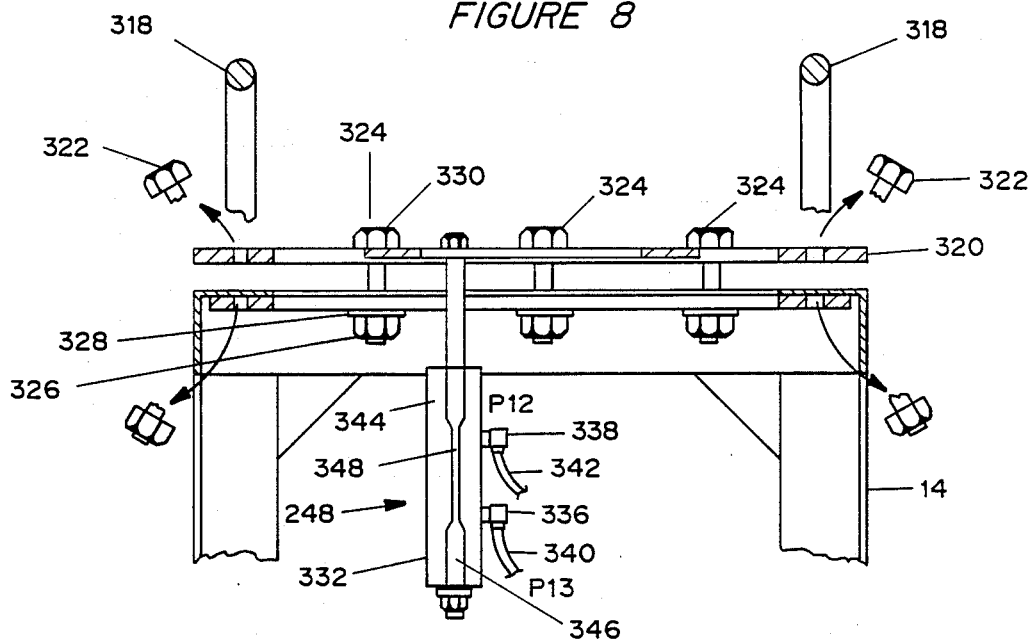

HYDRAULIC RELEASE SYSTEM FOR USE IN A BOREHOLE APPARATUS

RELATED APPLICATION

This application is a continuation-in-part of U.S. patent application Ser. No. 885,048 filed July 14, 1986 now U.S. Pat. No. 4,784,238.

BACKGROUND OF THE INVENTION

This invention relates to apparatus for use in a borehole traversing subsurface earth formations, and more particularly to apparatus for acquiring signals at different levels within a borehole.

The Vertical Seismic Profile (VSP) technique uses a combination of geophysical seismic and well logging techniques to obtain data. In addition to measuring the elapsed time for a surface-activated energy source pulse to travel to a subsurface geophone, the VSP technique records data beyond the first arrival of the propagating pulse and records all subsequent pulses as well. Because the VSP geophone is placed downhole rather than on the earth's surface, the VSP data images formation properties with greater detail than conventional seismic data.

In conducting a VSP operation, data must be collected by "anchoring" a geophone at a plurality of depth locations within a borehole. Once the instrument is anchored in position within a borehole tension is released from the cable and a seismic impulse is generated at or near the earth's surface. Related signals are detected at the geophone.

One apparatus for conducting the VSP operation is described in U.S. Pat. Nos. 4,563,757 and 4,575,831. This apparatus utilizes a sonde suspended in the borehole from a cable and having an anchoring pad. The pad is anchored to one side of the borehole wall to force the sonde into contact with the formation. While such an apparatus can be utilized in normal diameter boreholes, it is unsuitable for use in relatively large diameter boreholes, those in excess of approximately one (1) meter. In the large borehole environment an instrument of this design is not capable of exerting sufficient force on the pad member to prevent slippage of the sonde along the borehole wall when tension is removed from the cable.

Accordingly, the present invention overcomes the deficiencies of the prior art by providing apparatus for rigidly anchoring a detector at locations within a large diameter borehole.

SUMMARY OF THE INVENTION

Apparatus for positioning a detector at one or more depth positions against the wall of a large diameter borehole includes an elongated body member adapted to be positioned within the borehole. A pair of diametrically opposing pad displacement members are mounted on and extending from the pad displacement member. A pair of wall engaging pad members are pivotally attached to the pad carrier member. The piston is extendable from the pad displacement member to force each pad member into contact with the borehole wall. A single detector mounts behind one or more of the pad members.

In case of hydraulic system failure an electrical safety system is provided which, when activated, retracts and lowers the pad displacement members. In case of electrical system failure an automatic timer activated safety system performs the function. Should both these safety systems be inoperative, the pad displacement members can be retracted and lowered by pulling a preselected tension on the cable suspending the instrument within the borehole.

DETAILED DESCRIPTION OF THE PREFERRED EMBODIMENT

Figure 1:
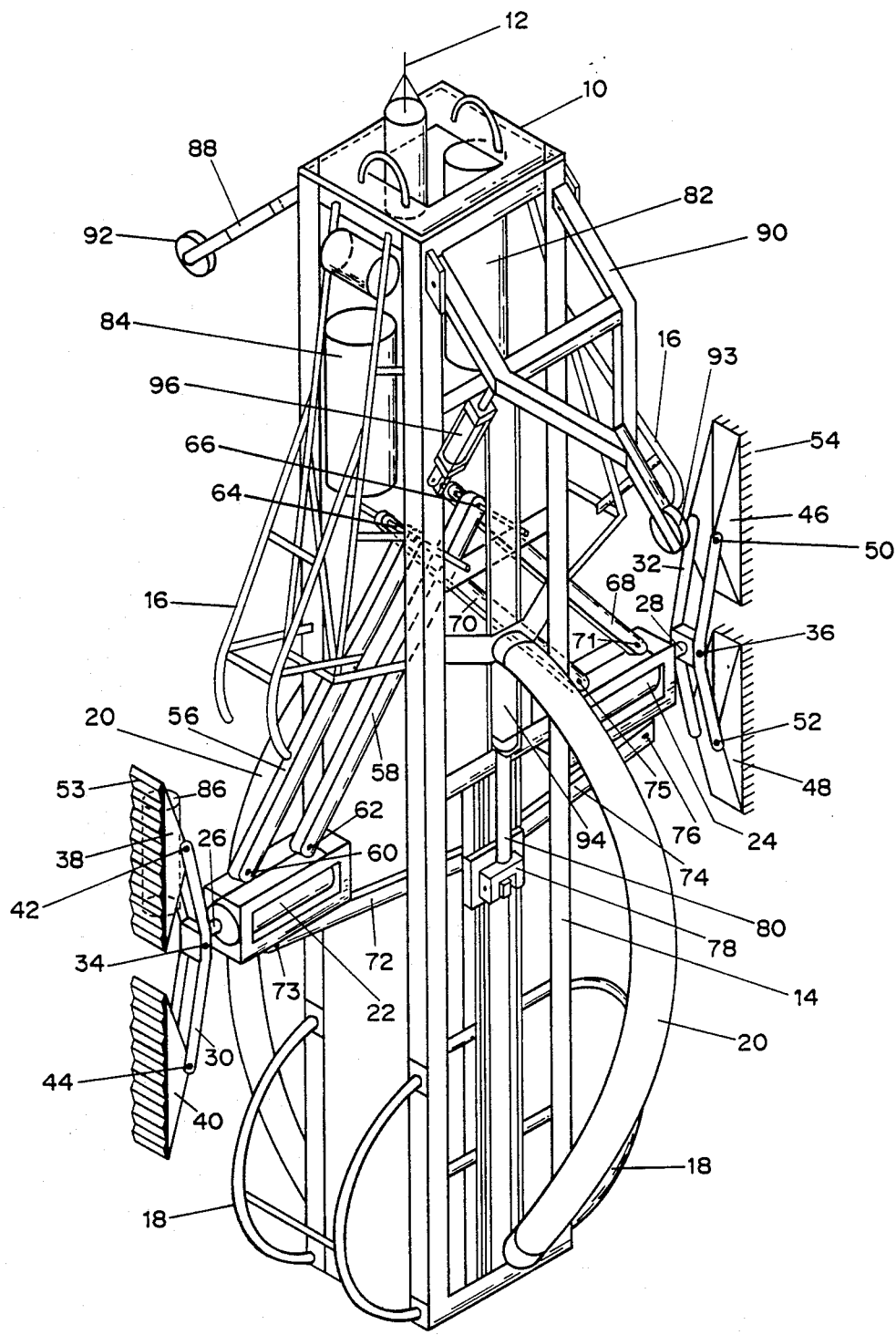
FIG. 1 is an isometric view of the instruments.

Referring now to the drawings in more detail, particularly to FIG. 1, there is illustrated instrument 10 which in operation is disposed at locations along an earth borehole (not shown) by means of cable or wireline 12 being wound on or unwound from a drum (not shown) located at the earth's surface. Instrument 10 includes a generally elongated body member 14 adapted to traverse the borehole. A plurality of upper rigid centralizer members 16 are attached to and extend outwardly from opposite sides of body member 14. A plurality of lower rigid centralizer members 18 are attached to and extend outwardly from the same opposite sides of body member 14 as upper centralizer member 16. In addition, a pair of flexible centralizer members 20 are attached to body member 14. Centralizer members 16, 18 and 20 serve to maintain instrument 10 in a generally centralized position along the longitudinal axis of the borehole.

Attached to body member 14 is the anchoring mechanism of the present invention. Anchoring mechanism includes a first and a second hydraulic powered pad displacement member, 22 and 24. Pistons 26 and 28 are extendable from and retractable into pad displacement members 22 and 24, respectively, under hydraulic fluid pressure control to be described later herein. Generally "V" shaped pad mounting members 30 and 32 are pivotally connected at the apex 34 and 36, respectively, to pistons 26 and 28. A pair of wall engaging pad members 38 and 40 are pivotally connected at 42 and 44 to pad mounting member 30 and a pair of wall engaging pad members 46 and 48 are pivotally connected 50 and 52 to pad mounting member 32, Each pad mounting member 30 and 32 can pivot approximately fifteen degrees in the vertical plane. Each pad member 38, 40, 46 and 48 can pivot on pad mounting members 30 and 32 approximately ten degrees in the same vertical plane. Affixed to the face of each pad members 46 and 48 are plurality of pointed projections, illustrated at 54, to provide penetration into the borehole wall when pad members 46 and 48 are engaged therewith. Pad members 38 and 40 are equipped with a plurality of ridged projections 53 on the wall engaging force thereof.

Pad displacement member 22 is coupled to body member 14 by a set of linkage arms 56 and 58 pivotally connected to pad displacement member 22 at 60 and 62. Linkage arms 56 and 58 are articulated at 64 and 66, respectively, to body member 14 and are at least substantially parallel. Pad displacement member 24 is coupled to body member 14 by a set of linkage arms 68 and 70 pivotally connected to pad displacement member 24 at 71 and 75. Linkage arms 68 and 70 are articulated at 66 and 64, respectively, to body member 14 and are at least substantially parallel. It should be recognized that linkage arm pairs 56 and 58, and 68 and 70 will maintain the longitudinal axis of pad displacement members 22 and 24 substantially perpendicular to the longitudinal axis of body member 14, or in other words in generally horizontal plane.

In order that pad displacement members 22 and 24 can be deployed from a first position within body member 14 to an extended position outside body member 14, linkage arm 72 is pivotally connected at 73 to pad displacement member 22 and linkage arm 74 is pivotally connected at 76 to pad displacement member 24. The other end of linkage arms 72 and 74 are coupled at lift arbor 78 to actuating rod 80. Rod 80 functions as a piston member for lift/lower power member 94 and moves in translation to the longitudinal axis of body member 14 in response to hydraulic fluid pressure at lift/lower power member 94, a process which will be described in greater detail herein, causing lift arbor 78 to move longitudinally on body member 14, further causing pad displacement members 22 and 26 to be extended outwardly from and retracted into body member 14.

Pivotally connected to body member 14 adjacent to the proximal end thereof are a pair of hydraulic powered stabilizer arms 88 and 90. Arms 88 and 90 include a wheel portion 92 and 93, respectively, at the borehole wall engaging end thereof. Each stabilizer arm 88 and 90 is further interconnected to the body member 14 by way of stabilizer displacement members such as 96. Each displacement member 96 is pivotally coupled at one end to the stabilizer arm 88 and 90, and at the opposite end to the body member 14. Each stabilizer displacement member is hydraulically powered and extends and retracts each stabilizer arm relative to the body member 14.

Retained within body member 14 is a hydraulic power system 82 coupled by hydraulic lines to pad displacement members 22 and 24, lift/lower power member 94, and stabilizer displacement members 96. Also retained within body member 14 is subsurface electronics 84, including the required power supplies and amplifiers necessary for operation of the instrument. Mounted to the back side of one wall engaging pad member, for example 38, is a signal detector section 86 which is connected to subsurface electronics 84. Detector section 86 comprises a geophone. In the preferred embodiment six geophones connected in parallel comprise detector section 86.

Figure 2:
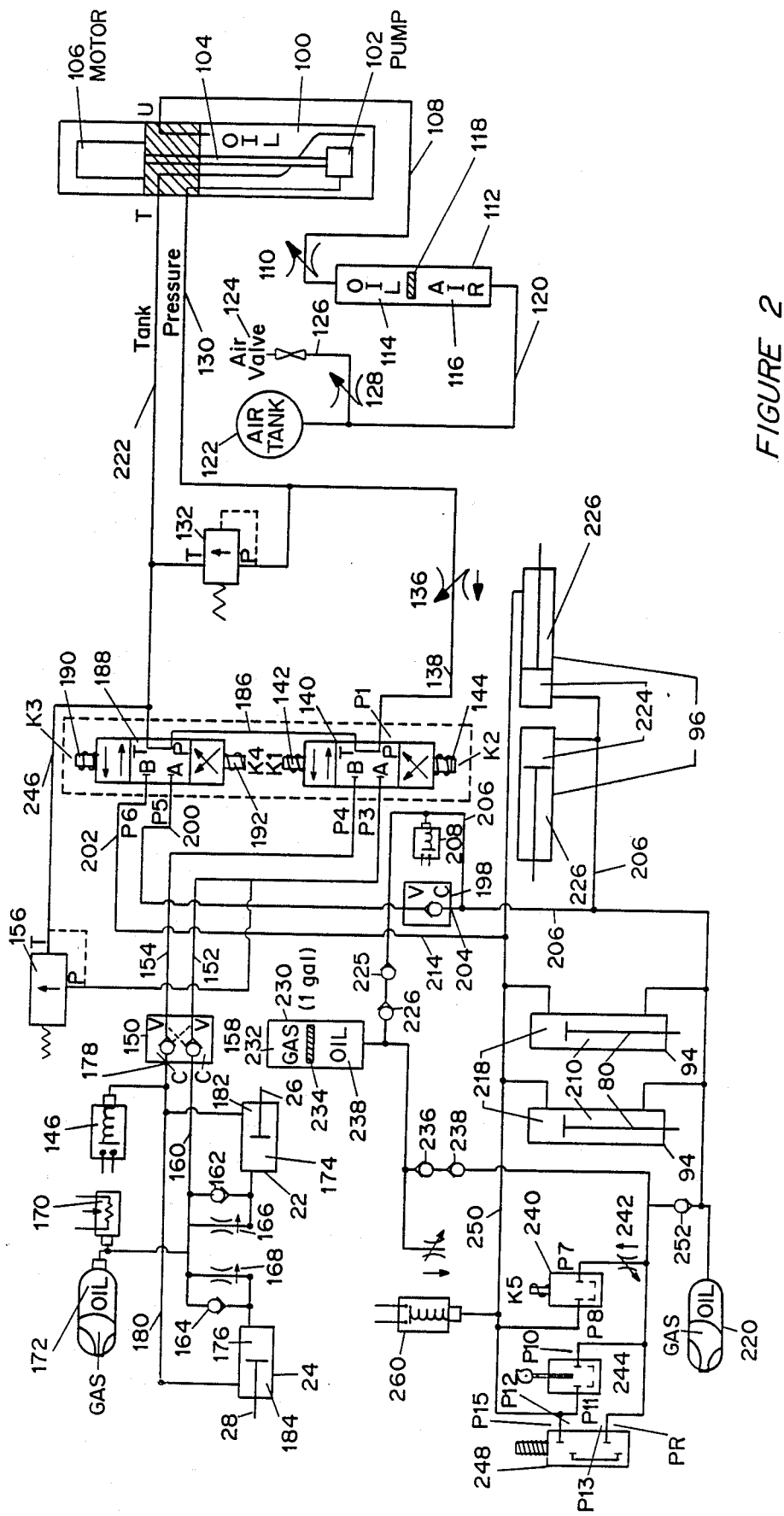
FIG. 2 is a schematic representation of the hydraulic power system used in the instrument.

Referring now to FIG. 2, there is illustrated in schematic form the hydraulic power system of the present invention. The hydraulic power system includes a fluid reservoir 100, containing a hydraulic fluid such as oil or the like. Disposed within reservoir 100 is hydraulic pump 102 which is coupled through shaft 104 to electric motor 106. Reservoir 100 is fluidly connected through hydraulic line 108 and flow control valve 110 to pressure chamber 112. Pressure chamber 112 comprises a first hydraulic fluid reservoir 114 and a second air chamber 1216 isolated from each other by piston 118. Air chamber 116 is connected by line 120 to air tank 122. Air valve 124 is connected through line 126 and control valve 128 to line 120. Air tank 122, air valve 124, control valve 128 and pressure chamber 112 function to maintain the fluid level within reservoir 100.

The output of pump 102 is connected through hydraulic line 130 to pressure relief valve 132 and flow control valve 136. The other side of flow control valve 136 is connected through line 138 to port P1 of four-way valve 140. Four-way valve 140 is an electrically controlled flow valve operated by lock solenoid 142 and retract solenoid 144. Ports P3 and P4 of valve 140 are coupled to pilot control check valve 150 by lines 152 and 154, respectively. In addition, line 152 connects to pressure relief valve 156.

Output 158 of pilot control check valve 150 connects by line 160 to pilot check valves 162 and 164, flow control valves 166 and 168, pressure transducer 170 and accumulator 172. The other side of valves 162 and 166 connects to chamber 174 of pad displacement member 22. The other side of valves 164 and 168 connects to chamber 176 of pad displacement member 24. Output 178 of pilot control check valve 150 connects by line 180 to chamber 182 of pad displacement member 22 and to chamber 184 of pad displacement member 24 and to pressure switch 146.

Port P1 of four-way valve 140 also connects through line 186 to port P2, of four-way valve 188. Four-way valve 188 is electrically controlled by lift solenoid 190 and lower solenoid 192. Ports P5 and P6 are connected to pilot valve 198 by lines 200 and 202, respectively. Output 204 of pilot check valve 198 connects by line 206 to pressure switch 208, chambers 210 of lift/lower power member 94, accumulator 220 and chambers 224 of stabilizer displacement members 96. Pressure switch 208 connects through pilot check 225 and 226 to chamber 228 in reservoir 230. Chamber 228 is precharged with hydraulic fluid and is isolated from gas chamber 232 by isolation piston 234. Chamber 228 connects through pilot check valves 236 and 238 to solenoid valve 240, through flow control valve 242; and to mechanical clock valve 244, mechanical slide valve 248, and to pilot check valve 252.

Output 204 of pilot check valve 198 connects by line 216 to chambers 218 of lift/lower power members 94 and chambers 226 of stabilizer displacement members 96. Chambers 218 and 226 connect through line 250 to switch 260, and the outputs of solenoid valve 240, clock valve 244 and slide valve 248.

Port P2 of four-way valve 188 also connects through line 246 to pressure relief valve 156 and through line 222 to pressure relief valve 132 and fluid reservoir 100.

In the operation of anchoring detector 86 to the borehole wall, instrument 10 is placed in position within the borehole. The "LIFT" function is selected at the surface control system and electrical power is applied to motor 106 through wireline 12. Selection of the "LIFT" function causes lift solenoid 190 to shift four-way valve 188 making fluid connection between input port P1 and output port P5. Motor 106 causes pump 102 to force pressurized hydraulic fluid from reservoir 100 through line 130, 138 and 186 to four-way valve 188, line 200, pilot control check valve 198 and into chambers 210 of lift/lower power members 94 and chambers 224 of stabilizer displacement members 96. Pump 102 is capable of flow of 2 liters per minute at a pressure of 1500 psi. Thus, stabilizers 88 and 90 are shifted into engagement with the borehole wall and rod 80 is moved upward on body member 14. The movement of rod 80 causes left arbor 78 to move pad displacement members 22 and 24, through linkage arms 72 and 74, from within body member 14 to an extended position. In the preferred embodiment linkage arms 72 and 74 are selected to position pad members 38, 40, 46 and 48 within approximately two inches from the borehole wall when pad displacement members 22 and 24 are in an extended position.

To set pad members 38, 40, 46 and 48 the "LOFT" mode is selected and lock solenoid 142 is activated allowing fluid communication to be made within four-way valve 140 from port P1 to port P3. Thus, hydraulic fluid pressure passes through pilot control check valve 178 and flow control valve 166 and 168 into chambers 174 and 176 of pad displacement members 22 and 24 forcing pistons 26 and 28 outwardly until pads 38, 40, 46 and 48 engage the borehole wall. This anchors detector 86 into position adjacent the formation. With detector 86 anchored into position tension is released from cable 12 allowing instrument 10 to receive seismic signals. Given the pump operating pressure and the dimension of each piston 26 and 28 approximately 18,000 pounds of force is developed by pad displacement members 22 and 24. With each pad member having approximately 132 square inches of borehole wall contact force approximately 68 pounds per square inch of pressure is on the pad face.

Once seismic operations are complete at a depth location instrument 10 must be moved to a different location within the borehole, thus the "RETRACT" mode is selected. Retract solenoid 144 is energized shifting four-way valve 140, allowing hydraulic fluid to pass from port P1 to port P4. Hydraulic fluid passes through line 154, pilot check valves 150 to chambers 182 and 184 of pad displacement members 22 and 24 retracting pad members 38, 40, 46 and 48. Hydraulic fluid in chambers 174 and 176 is moved back into reservoir 100 via check valve 162 and 164, pilot check valve 150, port P3 and port P2 and line 222.

With pad members 38, 40, 46 and 48 retracted pad displacement members 22 and 24 can be lowered into body member 14 by selection of the "LOWER" mode. Solenoid 192 is energized shifting four-way valve 188 allowing hydraulic fluid to pass from port P1 to port P6 of valve 188 through pilot control check valve 198 to chambers 218 of lift/lower power member 94. Fluid is forced from chambers 210 to reservoir 100 through control check valve 198 to port P5 to reservoir 100 through port P2 and line 222. In addition, hydraulic fluid passes along the same path from chambers 224 of stabilizer displacement members 96 allowing stabilizer 88 and 90 to retract.

Instrument 10 is equipped with a redundant safety system for use in the event it becomes impossible to activate the tool on the "RETRACT" and "LOWER" function once pads 38, 40, 46 and 48 are locked against the borehole wall. Solenoid valve 240 is activated allowing hydraulic fluid to flow between ports P7 and P8. Pressurized fluid from chamber 228 flows through check valves 236 and 238 through flow control valve 242 to valve 240. Hydraulic fluid also flows from chambers 210 of lift/lower power member 94 to chambers 218 and from chambers 224 of stabilizer displacement members 96 to chambers 226 by way of solenoid valve 240, allowing stabilizer 88 and 90 to retract and lift/lower power member 94 to retract pad displacement members 22 and 24 away from the borehole wall.

In the instance of an electrical malfunction the safety retraction function is performed by mechanical clock valve 244. Clock valve 244 is set before instrument 10 is lowered into the borehole to activate after a predetermined delay period, for example twenty-four hours. After the pre selected delay period clock valve 244 will activate allowing fluid flow therethrough. Thereafter, hydraulic fluid flow will occur as described in connection with solenoid valve 240.

Should solenoid valve 240 be inoperative and clock valve 244 malfunction the release function is performed by mechanical slide valve 248. Valve 248 is activated by pulling a preselected amount of tension with cable 12. For example, pulling approximately 16,000 pounds of tension through cable 12 will cause slide valve 248 to establish fluid communication therethrough allowing pad displacement members 22 and 24 to retract as previously described.

Figure 3:
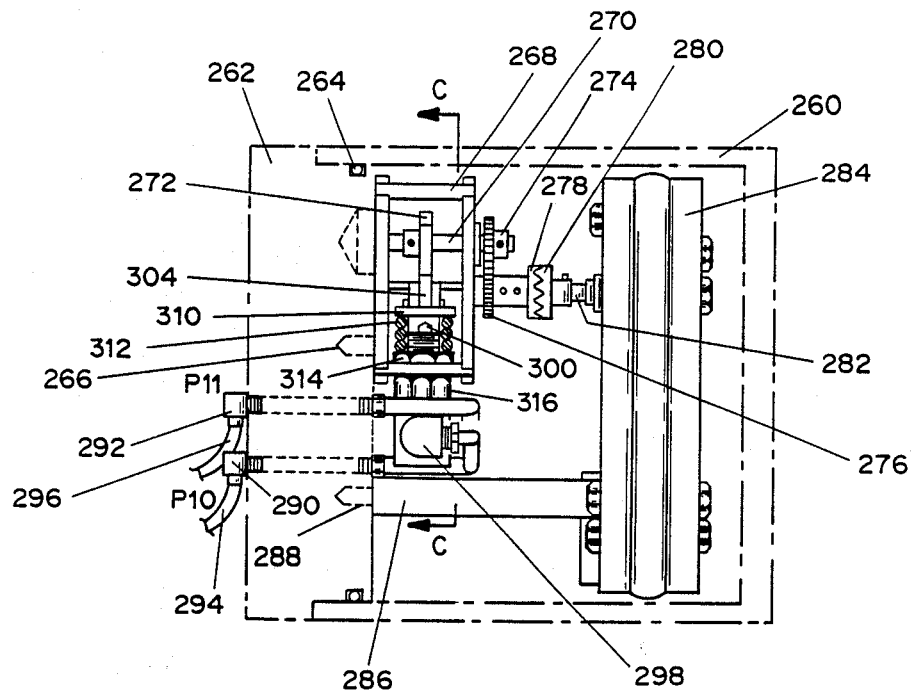

Referring now to FIG. 3, a more detailed view of mechanical clock valve 244 may be seen. Clock value 244 is contained within cannister 260, and mounting block 262 fits securely into an open face of cannister 260 to form a complete enclosure. O-ring 264 furnishes a fluid tight seal between mounting block 262 and cannister 260. Attached to mounting block 262 by bolt 266 is valve housing 268, in which is rotatably disposed cam axle 270, which carries cam 272. Cam axle 270 also carries drive gear 274, the teeth of which mesh with the teeth of power gear 276.

Power gear 276 is carried on coupling head 278, which is rotatably mounted on valve housing 268. At the end of coupling head 278 distal from power gear 276, coupling head 278 has teeth oriented in a direction perpendicular to the direction of orientation of the teeth of power gear 276. The teeth on coupling head 278 intermesh with teeth on disengaging coupling 280, which is carried on coupling rod 282. Disengaging coupling 280 is slidable along coupling rod 282 from a position wherein its teeth are intermeshed with those of coupling head 278 to a position wherein its teeth are disengaged from those of coupling head 278. When disengaging coupling 280 is in a position wherein its teeth are engaged with those of coupling head 278, as shown in FIG. 3, the rotation of coupling rod 282 causes the rotation of both disengaging coupling 280 and coupling head 278. Coupling rod 282 is connected to, and caused to rotate by, clock 284. Clock 284 rests on cannister 260, and is attached to mounting block 262 by, and thus held in place by, space bar 286 and bolt 288.

Figure 4:
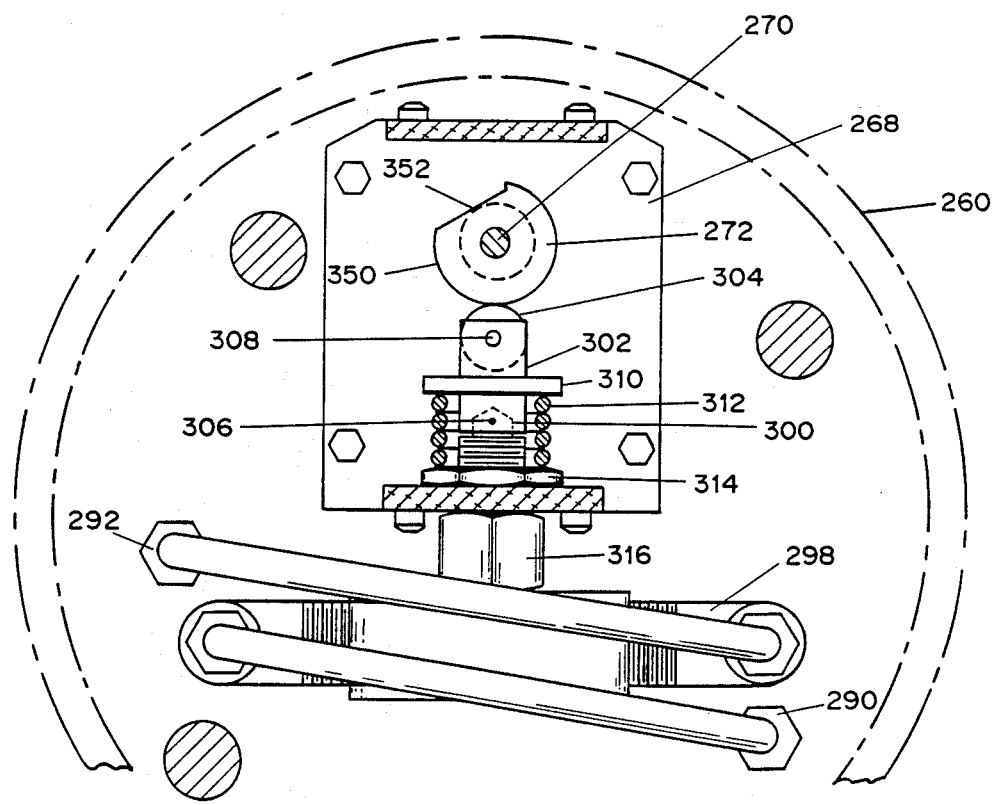
Figure 5:
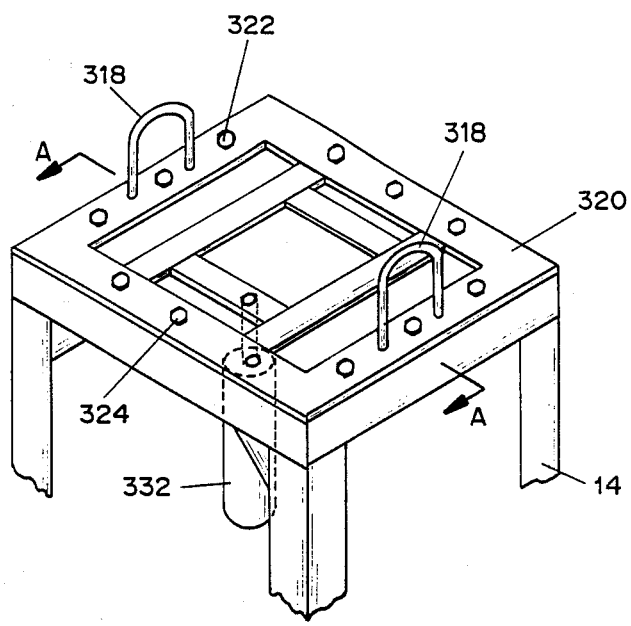

Also attached to mounting block 262, are fittings 290, 292 which hold hydraulic tubes 294, 296. Tube 294, 296 and valve housing 268 are shown in more detail in FIG. 4, wherein port P10, the inflow port for clock valve 244, is held by fitting 290, and port P11, the outflow port, is held by fitting 292. Hydraulic fluid flowing in from tube 294 passes through valve body 298 and out through tube 296. Valve body 298 is suspended from valve housing 268 and contains a seat (not shown) for receipt of valve stem 300. When it is received in said seat, valve stem 300 prevents the flow of hydraulic fluid from port P10 to port P11 through valve body 298. Valve stem 300 is slidable along a direction of travel described by a line between cam 272 and valve body 298, as is valve shaft 302. Valve shaft 302 is a cylindrical member with an internal bore, wherein is mounted roller 304, at an upper end proximate cam 272, and pin 306, at a lower end proximate stem 300. Roller 304 rotates freely within valve shaft 302 on roller axle 308. A portion of stem 300 is disposed within valve shaft 302; and pin 306 is inserted, in a direction perpendicular to the longitudinal axes of stem 300 and valve shaft 302, completely through said portion of stem 300 and the surrounding walls of valve shaft 302. Valve shaft 302 has a collar 310 on its exterior, and coil spring 312 is compressed by collar 310 against nut 314. Nut 314 is disposed on threads on the exterior of valve shaft 302, and secures valve housing 268 to valve coupling 316. Through the force it exerts on collar 310, spring 312 biases roller 304 against cam 272.

Referring now to FIGS. 5-8, mechanical slide valve 248 can be seen in more detail. As previously discussed, body member 14 is a frame with a generally rectilinear shape, and is supported by cable 12 by slings (not shown) secured to loops 318. Loops 318 are fixedly attached to top plate 320, which is in turn bolted to body member 14.

Figure 6:
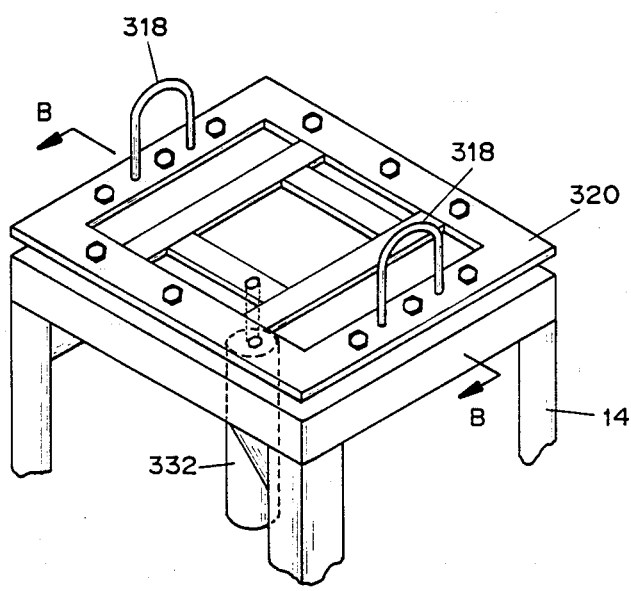

The bolts by which top plate is secured to body member 14 are of two kinds. Breakaway bolts 322 have a weak point, typically an external circumferential groove, which reduces their tensile strength to a level which allows them to be parted, as shown in FIGS. 6 and 8, by an amount of tension which can easily be pulled through cable 12. However, breakaway bolts 322 have sufficient tensile strength to keep top plate 320 attached to body member 14 in the case of ordinary operations where the tension on cable 12 is no greater than that caused by the weight of the instrument 10. Retaining bolts 324 have sufficient tensile strength to remain undamaged by the amount of tension pulled through cable 12 necessary to part breakaway bolts 322. Breakaway bolts 322 secure top plate 320 to the surface of the top end of body member 14 such that no separation exists between top plate 320 and body member 14. When top plate 320 is thus secured to body member 14, the threads on a retaining bolt 324 do not allow a nut 326 to advance far enough along said retaining bolt 324 for said nut 326 (or a washer 328) to be fully tightened against body member 14 while the head 330 of said retaining bolt 324 sits on top plate 320 with no separation therebetween. With the head 330 of a retaining bolt 324 sitting on top plate 320, when a nut 326 is advanced as far as possible along the threads of said retaining bolt 324, a washer 328 advanced by said nut 326 sits a distance of approximately two inches (2") away from body member 14, as shown in FIG. 7.

Mechanical slide valve 248 incorporates a cylindrical valve casing 332, within which is disposed actuator arm 334. Fittings 336, 338 are mounted on valve casing 332 and permit the fluid communication of hydraulic tubes 340, 342 with channel 344, the internal bore of value casing 332. Fitting 338 holds port P12, the outflow port for slide valve 248, and fitting 336 holds port P13, the inflow port. With actuator arm 334 in the position as shown in FIG. 7, when there is not separation between top plate 320 and body member 14, fluid is able to enter channel 344 through port P13 but is blocked from exit through port P12. Actuator arm 334, which is closely but slidably disposed in channel 344, has a full diameter portion 346 which is closely enough received in channel 344 to prevent, when arm 334 is in the position shown in FIG. 7, the passage of fluid between channel 344 and port P12. Actuator arm 334 also has a reduced diameter portion 348 which furnishes an annular space between it and the internal wall of valve casing 332 forming channel 344. Such annular space is sufficient to allow fluid communication between channel 344 and a port, being port P13 when actuator arm 334 is in the position shown in FIG. 7.

Actuator arm 334 is slidable longitudinally within valve casing 332, and an upper end of actuator arm is attached to top plate 320. Valve casing 332 is attached to body member 14. When tension is exerted on cable 12 sufficient to sever breakaway bolts 322 and separate top plate 320 from body member 14, actuator arm 334 is moved through channel 344 in the direction of travel of top plate 320. Such movement of top plate 320 shifts the position of the reduced diameter portion 348 of actuator arm 334 in channel 344, placing such reduced diameter portion 348 adjacent to both ports P12 and P13. Actuator arm 334 is thereupon in the position shown in FIG. 8, and fluid communication is in such case made possible between channel 344 and both ports P12 and P13.

In field operations, mechanical clock valve 244 is set for a predetermined period of time, typically up to a maximum of 24 hours, before the instrument 10 is lowered into the borehole. For the purpose of setting the clock 284, the teeth of disengaging coupling 280 may be disengaged from those of coupling head 278. This allows cam 272 to be rotated to a position where the rounded perimeter portion 350 of cam 272 abuts roller 304. This can be accomplished only if coil spring 312 is compressed, in which event valve stem 300 becomes seated in valve body 298. The rounded perimeter portion 350 of cam 272 is positioned such that maximum rotation of cam 272 is required before the lip 352, or flattened portion, of cam 272 contacts roller 304. The clock 284 is then set such that a prescribed length of time must pass before lip 352 of cam 272 will contact roller 304. With the teeth of disengaging coupling 280 and coupling head 278 interlocked, the clock 284 rotates disengaging coupling 280, which rotates coupling head 278 and thus cam 272. If, by the end of such length of time, it has not been possible to operate the "RETRACT" and "LOWER" functions by the hydraulic controls described above or by electric solenoid safety valve 240, clock 284 will bring lip 352 into contact with roller 304. As cam 272 continues to rotate after such contact, the vertical throw available to valve shaft 302 increases. Coil spring 312 pushes valve shaft 302 up away from valve body 298 to the maximum extent allowed by lip 352 of cam 272. As valve shaft 302 is lifted away from valve body 298, valve stem 300 is lifted out of its seat because of the connection furnished by pin 306, allowing hydraulic fluid to flow through valve body 298. Pressurized fluid is then free to flow out of chamber 228, as described above, to allow operation of the "RETRACT" and "LOWER" functions.

Should it be desirable to release the instrument in a time period less than the preselected clock time or should mechanical clock valve 244 fail to function properly, mechanical slide valve 248 may be implemented. Pulling a prescribed amount of tension through cable 12 will cause breakaway bolts 322 to sever, allowing top plate 320 to become separated from body member 14. The weight of body member 14 is then supported by retaining bolts 324, which are of sufficient strength to remain unbroken after body member 14 has fallen away from top plate 320 and come to rest on washers 328. After body member 14 has fallen away from top plate 320, the position of actuator arm 334, which is attached to top plate 320, will have been changed in channel 344. The reduced diameter portion 348 of actuator arm 334 is now adjacent in channel 344 to both ports P12 and P13, as shown in FIG. 8. Hydraulic fluid flow in through tube 340, through channel 344 and out through tube 342 is then free to occur, and pressurized fluid flow out of chamber 228, as described above, will then allow operation of the "RETRACT" and "LOWER" functions.

Many modifications and variations beside those specifically mentioned may be made without departing substantially from the concept of the present invention. Accordingly, it should be clearly understood that the forms of the invention described and illustrated herein are exemplary only and are not intended as limitations on the scope of the present invention.

The embodiments of the invention in which an exclusive property or privilege is claimed are defined as follows:

1. An apparatus, suspended from a cable, for positioning an instrument within a borehole traversing a subsurface earth formation, comprising:
    an elongated body member adapted for suspension within said borehole;
    displacement means cooperatively arranged on said body member;
    wall engaging pad members coupled to said displacement means;
    hydraulic power means for deploying said pad members into contact with the wall of said borehole;
    first safety means, for electrically retracting said pad members from contact with said wall of said borehole in case said hydraulic power means fails to function;
    second safety means, time actuated, for retracting said pad members from contact with said wall of said borehole in case said hydraulic power means fails to function; and
    third safety means, mechanically actuated, for retracting said pad members from contact with said wall of said borehole in case said hydraulic power means fails to function.

2. The apparatus of claim 1, wherein said second safety means comprises a time delay actuated release valve.

3. The apparatus of claim 2 wherein said release valve comprises:
    a valve member having ports for hydraulic fluid flow therethrough;
    a rotating arm member; and
    means, responsive to rotation of said arm member, for controlling fluid flow through said valve member.

4. The apparatus of claim 3, wherein said means for controlling fluid flow comprise:
    a movable shaft member; and
    biasing means for moving said shaft member.

5. The apparatus of claim 4, further comprising a cam member for governing the movement of said shaft member.

6. The apparatus of claim 3 wherein said arm member is mechanically coupled to and rotated by a clock.

7. The apparatus of claim 1 wherein said third safety means comprises a cable tension actuated release valve.

8. The apparatus of claim 7, wherein said third safety means comprises:
    a valve member having ports for hydraulic fluid flow therethrough; and
    means, responsive to tension pulled through said cable, for controlling fluid flow through said valve member.

9. The apparatus of claim 8 wherein said means for controlling fluid flow comprise:
    a plate member releasably attached to said body member; and
    means for releasably attaching said plate member to said body member.

10. The apparatus of claim 9 further comprising a fluid flow control rod attached to said plate member.

11. The apparatus of claim 10 wherein said means for releasably attaching said plate member to said body member comprise a plurality of shear members.

12. The apparatus of claim 1, wherein said first safety means, comprises:
    a valve member having ports in fluid communication with said hydraulic power system,
    means, responsive to an electrical signal, for actuating said valve member, diverting hydraulic pressure from said wall engaging pad members, whereby said pad members retract from contact with the wall of said borehole.

13. The apparatus of claim 12, wherein said means responsive to an electrical signal comprises a solenoid operably coupled to a control panel located at the surface of the earth.

14. A safety release system for use in a well logging instrument having one or more well engaging contact members actuated by a hydraulic system, and suspended in a borehole by a cable, comprising:
    solenoid means, electrically actuated, for retracting said well engaging contact members in case of hydraulic system failure; and
    a mechanically actuated safety release system, in parallel with said solenoid means, for retracting said well engaging contact members in case of hydraulic system failure, said mechanically actuated safety release system further comprising
    (a) a time delay actuated release valve; and
    (b) a cable tension actuated release valve in parallel with said time delay actuated release valve.

15. The apparatus of claim 14, wherein said time delay actuated release valve comprises:
    a pressure release valve coupled to the hydraulic system;
    a mechanical clock for actuating said release valve, whereby after a predetermined period of time said clock actuates said pressure release valve and relieves hydraulic pressure exerted upon the well engaging contact members.

16. The apparatus of claim 14, wherein said cable tension actuated release valve comprises:
    a release valve coupled to the hydraulic system; and
    means responsive to cable tension for actuating said release valve, relieving hydraulic pressure exerted upon the well engaging contact members.

* * * * *